United States Patent [19]

Ineson

[11] Patent Number: 4,801,782
[45] Date of Patent: Jan. 31, 1989

[54] HEATED CUP

[76] Inventor: Leonard Ineson, 3574 Pitch Pine Crescent, Mississauga, Ontario, Canada, L5L 1P8

[21] Appl. No.: 929,535
[22] Filed: Nov. 12, 1986

[30] Foreign Application Priority Data

Jul. 7, 1986 [CA] Canada ................... 513252

[51] Int. Cl.⁴ ............................................. H05B 1/02
[52] U.S. Cl. .................................... 219/438; 219/441; 219/518
[58] Field of Search ............... 219/438, 439, 429, 432, 219/435, 437, 521, 433, 436, 440, 442, 441, 518

[56] References Cited

U.S. PATENT DOCUMENTS

| 1,062,344 | 5/1913 | Mann | 219/436 |
| 2,611,069 | 9/1952 | Frazier | 219/518 |
| 2,838,650 | 6/1958 | Lehr | 219/436 |
| 2,863,037 | 12/1958 | Johnstone | 219/436 |
| 3,432,641 | 3/1969 | Welke | 219/521 |
| 3,813,517 | 5/1974 | McGruder | 219/438 |
| 3,931,494 | 1/1976 | Fisher | 219/435 |
| 4,095,090 | 6/1978 | Pianezza | 219/435 |
| 4,307,287 | 12/1981 | Weiss | 219/432 |

FOREIGN PATENT DOCUMENTS 907269  3/1946  France ........................ 219/521

Primary Examiner—E. A. Goldberg
Assistant Examiner—Teresa J. Walberg
Attorney, Agent, or Firm—Moss, Hammond

[57] ABSTRACT

A vessel for maintaining a heated liquid hot, includes a receptacle to house the heated liquid, having an electrical heating element integral therewith and power connection leads electrically connected to the heating element; the vessel may suitably include a cup and support plate suitable for coffee and similar hot beverages.

16 Claims, 4 Drawing Sheets

HEATED CUP

BACKGROUND OF THE INVENTION

This invention relates to a vessel for maintaining a heated liquid in a heated state and to a method of maintaining a heated liquid in a heated state. More especially the invention is concerned with a cup or similar drinking vessel, for maintaining a hot beverage heated.

Hot beverages such as tea and coffee are widely used both inside and outside the home. One problem is that such hot beverages cool on standing when exposed to the atmosphere, whereas many users wish to leave the beverage standing over a period of time. In response to this problem heater plates have been developed which are designed to support the beverage cup and heat it, thereby heating the beverage. These plates suffer the disadvantage that the beverage cup becomes hot and the efficiency of heating of the beverage depends on the thermal conductivity of the cup.

SUMMARY OF THE INVENTION

The present invention seeks to overcome these disadvantages by providing a vessel for maintaining a heated liquid in a heated state comprising: a receptacle adapted to house a heated liquid; electrical heating means integral with the receptacle maintains the heated liquid in a heated state. Power connection means is electrically connected to the heating means to connect the heating means to a source of electrical power.

In particular the receptacle for supporting the heated liquid may be one having relatively good thermal conductivity, for example, glass or plastic, and may be mounted or seated in an outer holding container; optionally insulating means may be included between the holding container and the inner surface of the receptacle.

In particular the heating means is disposed on an outer surface, for example, the base surface, of the receptacle, and the vessel further includes a thermal activator switch conveniently disposed on an outer surface, for example, the side wall, of the receptacle. The thermal activator switch interrupts the electrical circuit between the heating means and the power source and functions to close or make the circuit in response to a predetermined temperature of the heated liquid, whereafter the heating means heats the liquid to maintain its temperature. Conveniently the predetermined temperature is established, in the case of a hot beverage, as a comfortable drinking temperature for the beverage.

Suitably the thermal activator switch may also function to open or break the circuit if the level of liquid falls below a predetermined level in the receptacle. This level is set to correspond with a small or residual amount of liquid in the receptacle and ensures, for example, that a residual quantity of beverage is not completely evaporated to leave a tar-like solid mass.

The power source for the heating means may comprise batteries stored in a battery compartment of the holding container or an external source, for example, the cigarette lighter outlet in an automobile or a conventional domestic outlet, although in the latter case a step-down transformer is suitably included in the circuit to reduce the power supplied.

The vessel may be provided for use either with batteries or an external power source and may include means for recharging the batteries, in the case of rechargeable batteries.

The vessel, in particular, includes a support plate in which the holder container is seated. The support plate includes electrical power connection for connection with an external power source and electrical connection is provided between the support plate and the holder container.

In another aspect of the invention there is provided a method of maintaining a heated liquid in a heated state.

BRIEF DESCRIPTION OF THE DRAWINGS

The invention is illustrated in particular and preferred embodiments by reference to the accompanying drawings in which.

DETAILED DESCRIPTION OF PREFERRED EMBODIMENT

Figure 1:
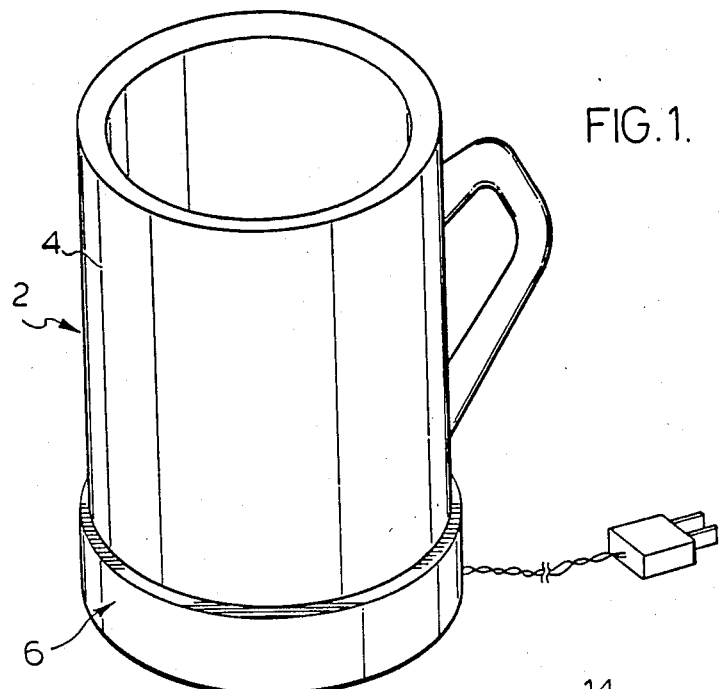
FIG. 1 is a perspective view of a vessel of the invention.

With further reference to FIG. 1, a vessel 2 comprises a cup portion 4 seated on a support plate 6 from which extends an electrical supply lead for connection to a power source (not shown).

Figure 2:
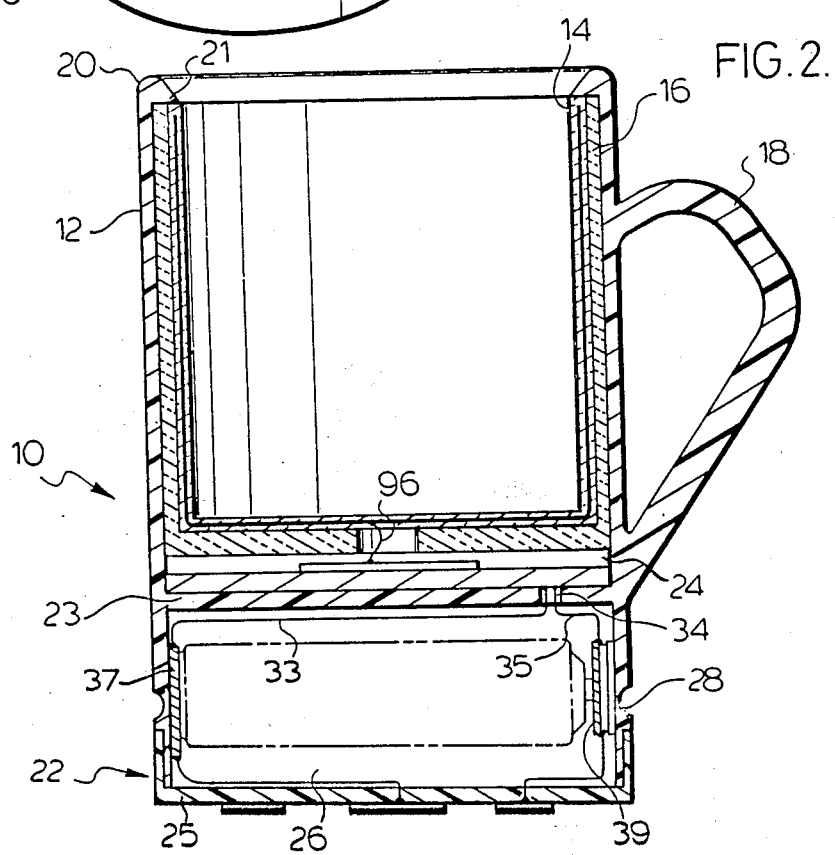
FIG. 2 is a cross-sectional elevation of a cup component of the vessel of the invention.
Figure 3:
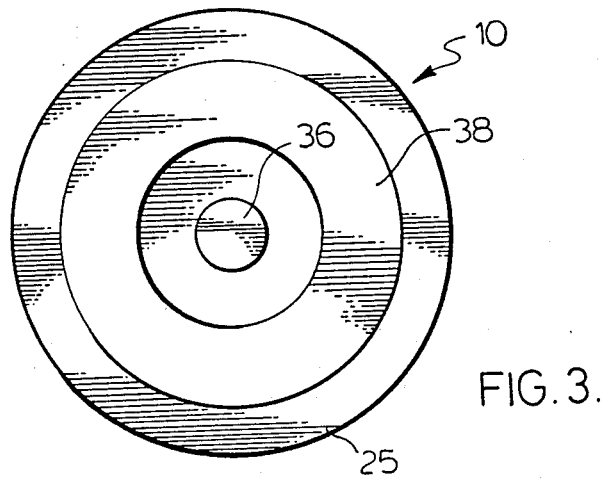
FIG. 3 is a bottom view of the cup of FIG. 1.
Figure 6:
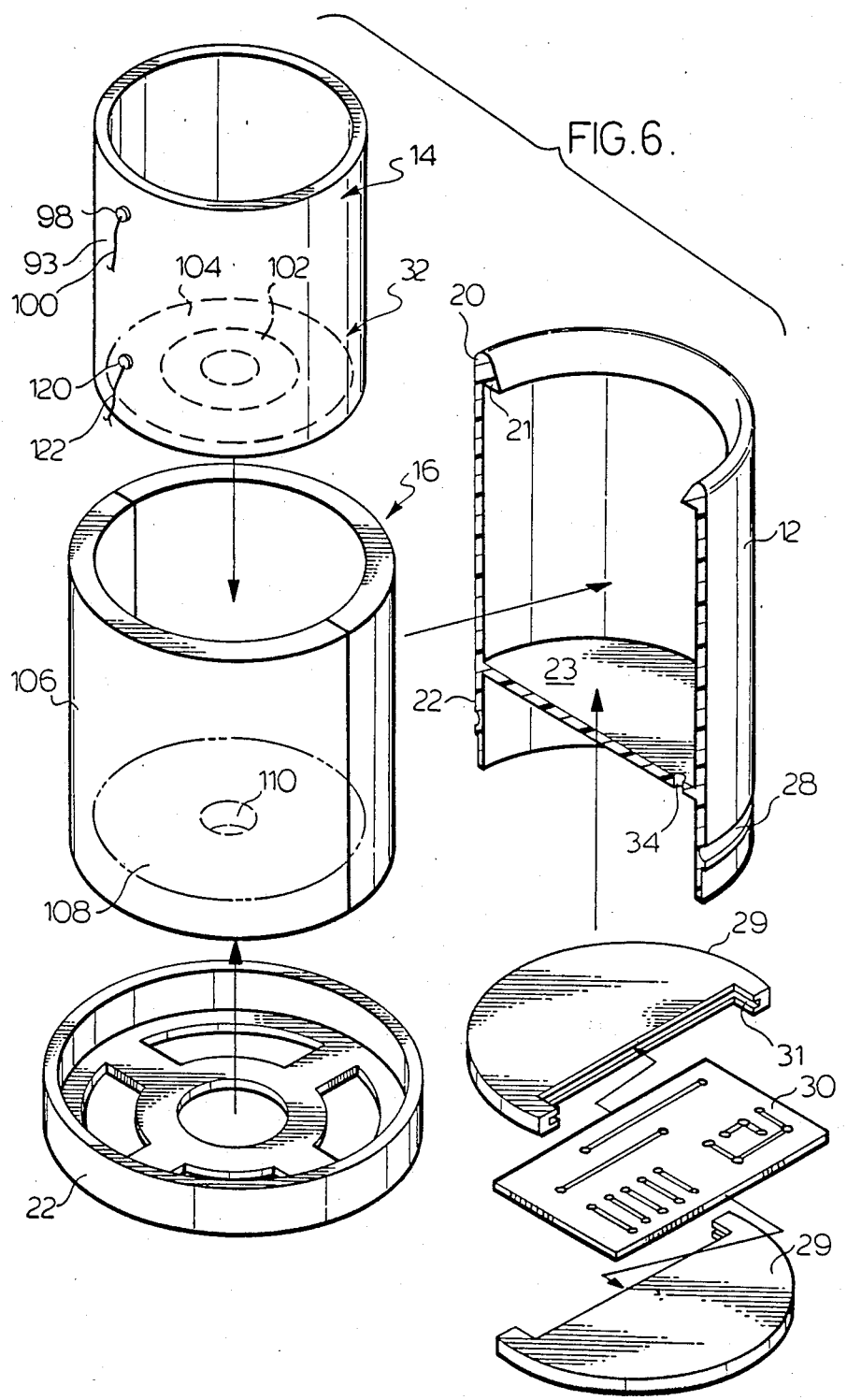
FIG. 6 is an exploded view of the cup of FIG. 2.

With further reference to FIGS. 2, 3 and 6, a cup 10 comprises a cylindrical holder 12, a cylindrical receptacle 14 and an insulating jacket 16 between holder 12 and receptacle 14.

Holder 12 includes a handle 18, a rim 20 having a lip 21 and a bottom cap 22 having a roof 23 and a floor 25.

A circuit chamber 24 is defined in holder 12 between roof 23 and insulating jacket 16.

A battery compartment 26 is defined in cap 22 between the roof 23 and floor 25; an orifice 34 in roof 23 provides passage for electrical leads 33 and 35. Cap 22 includes an annular channel 28.

A retainer frame 29 having opposed slots 31 is seated on roof 23.

A printed circuit board 30 bearing the electrical circuit is mounted in circuit chamber 24 between slots 31, and electrically connected to a heating system 32 on the underside of receptacle 14.

Battery compartment 26 has opposed positive and negative battery contact plates 37 and 39, the latter being spring mounted to the battery compartment wall. Electrical leads 33 and 35, respectively connect circuit board 30 to plates 37 and 39, respectively.

As can be particularly seen in FIG. 3, floor 25 bears a positive contact element 36 and a negative element 38. Element 36 is electrically connected to plate 37 by a lead 41 and element 38 is electrically connected to plate 39 by a lead 43.

Figure 4:
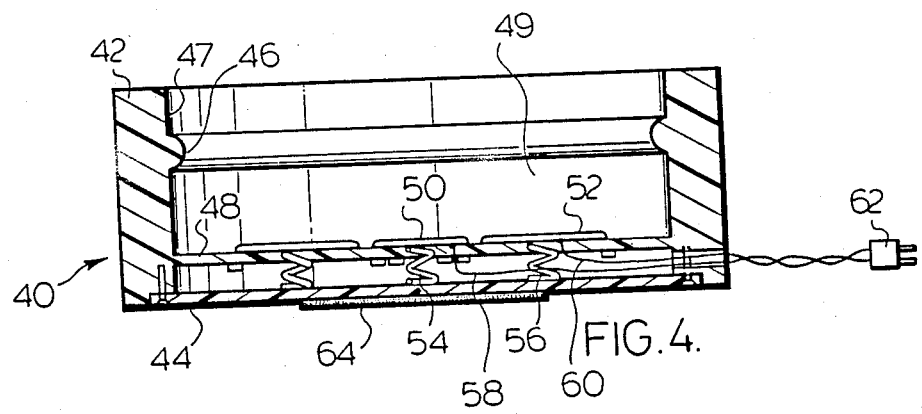
FIG. 4 is a cross-sectional elevation of a support plate as a component of the vessel, for mounting in a vehicle.

With reference to FIG. 4 there is shown a support plate 40 suitable for mounting in a vehicle, to house the cup 10 of FIG. 2.

Support plate 40 has an annular wall 42 and a bottom cover 44. An annular rib 46 is defined in the inner surface 47 of wall 42.

An intermediate floor 48 is disposed vertically above bottom cover 44 and supports a positive contact element 50 for engagement with the positive contact element 36 of the cup 10, and a negative contact element 52 for electrical connection with the negative contact element 38 of cup 10.

Elements 50 and 52 are urged upwardly by springs 54 and 56 respectively. Element 50 is electrically connected to a positive lead 58 and element 52 is electrically connected to a negative lead 60. Leads 58 and 60 are connected to an electrical attachment 62 which may, for example, be an attachment for connection to the lighter receptacle in an automobile.

An adhesive layer 64 on the bottom surface of cover 44 serves to fixedly mount support plate 40 on the dash structure of an automobile.

A cylindrical cavity 49 is defined between annular wall 42 and intermediate floor 48 to receive cap 22, with annular rib 46 of support plate 40 engaging annular channel 28 of cap 22 to securely seat cup 10 in support plate 40.

Thus the cup 10 may be safely supported on the dash structure of an automobile.

Figure 5:
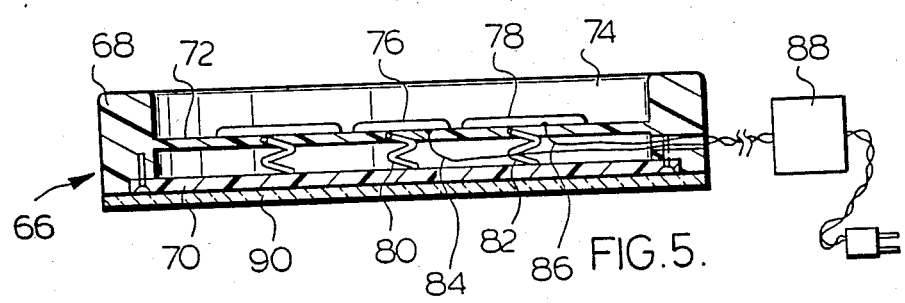
FIG. 5 is a cross-sectional elevation of a support plate, in a different embodiment, as a component of the vessel, for use on a desk top.

With further reference to FIG. 5, there is shown an alternative support plate 66 for use on a desk top. Support plate 66 comprises an annular wall 68 and a bottom cover 70. An intermediate floor 72 is disposed vertically above bottom cover 70 and a cylindrical cavity 74 is defined between annular wall 68 and floor 72.

Floor 72 bears a positive contact element 76 and a negtive contact element 78 which are urged upwardly by springs 80 and 82 respectively. Positive and negative leads 84 and 86, respectively, connect elements 76 and 78, respectively, to a transformer 88.

A felt pad 90 is mounted on the bottom surface of cover 70 to protect a desk top or similar surface on which the support plate 66 is to be located.

With further reference to FIG. 6, there is shown the cup 10 of FIG. 2 in an exploded view. Cylindrical receptacle 14 which may, for example, be of glass or a thermal plastic, has a base surface 92 and outer cylindrical surface 93. Heating system 32 comprises a heating element 94 formed as a coating on base surface 92, heater leads 96, a thermal activator switch 98 and a switch lead 100.

Heating element 94 more particularly includes an inner coating 102 of chrome and an outer coating 104 of indium tin oxide sputtered on base 92. Leads 96 are attached to the coatings using a conductive epoxy.

Insulating jacket 16 has a cylindrical wall 106, a floor 108 and an orifice 110 in floor 108 for passage of leads 96 and 100, from receptacle 14 to circuit board 30.

Figure 7:
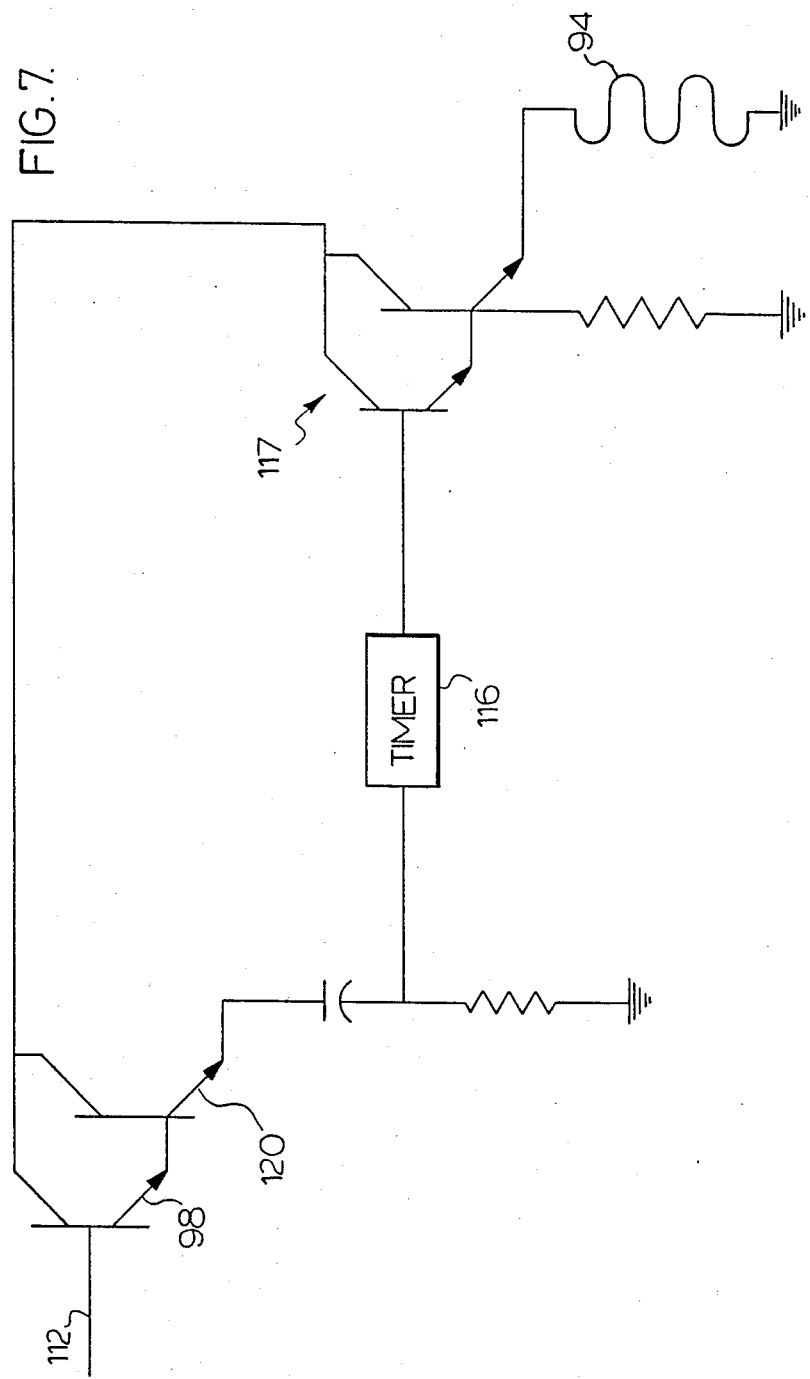
FIG. 7 is a circuit diagram for a vessel of the invention.

With reference to FIG. 7, an electrical circuit for the cup 10 includes a main power supply 112, typically of about 12 volts, a thermal activator switch 98, a timer 116 (available from exas Instruments as Catalogue No. 555), and a silicon controlled rectifier 117. Optionally a second thermal activator switch 120, having a switch lead 122, connected in series with switch 98, can be used, the purpose for which will be described below.

The thermal activator switches 98 and 120 are available from Midwest Incorporated as respective part numbers TS70B and TS80A respectively and are suitably mounted on surface 93 of receptacle 14 in the vicinity of the upper and lower regions, so that switch 98 is not above the initial level of the heated liquid in receptacle 14, but is remote from a lower region associated with a residual level of liquid at which switch 98 will open the circuit to switch off power to heating system 32.

In assembling the cup 10, heater leads 96 and switch lead 100 (and 122 where used) are fed from circuit board 30 through 110 in jacket 16 and are electrically connected between the heating element 94 and switch 98 (and switch 120 where used), respectively.

Jacket 16 forms a sleeve around receptacle 14 with leads 96 and 100 extending through orifice 110 to circuit board 30.

The cylindrical holder 12 is initially formed as two half portions which are secured together about jacket 16 so that lip 21 lies over the upper edge of receptacle 14.

During this assembly circuit board 30 is seated at its opposed edges in slots 31 of retainer frame 29 and positive and negative electrical leads 33 and 35 are fed through orifice 34 and electrically connected to battery connection plates 37 and 39.

In operation a heated liquid, for example, coffee at a temperature suitable for drinking is introduced into the receptacle 14 of vessel 10. Vessel 10 is supported either on a support plate 40 in an automobile vehicle or a support plate 66 on a desk top, the support plates 40 and 66 being electrically connected to a power source although, if preferred, reliance may be made on batteries located in battery compartment 26. In the case of support plate 40, this is secured to the automobile dash structure by the adhesive layer 64.

Thermal activator switch 98 functions to complete the electrical circuit thereby permitting flow of power to heating system 32, in response to the heated liquid. The liquid must be not lower than a predetermined temperature in order to activate the switch 98. The predetermined temperature selected is one at which the liquid is at a desirable drinking temperature.

Thermal activator switch 98 also functions to open the electrical circuit thus switching off power to the heating element 94, when the level of heated liquid reaches a predetermined low or residual level in receptacle 14, remote from switch 98 so that the heat of the residual liquid no longer activates switch 98.

Timer switch 116 serves to turn off the supply of power to heating element 94 periodically. For example, timer switch 116 may function such that the power is turned off for two minutes and on for 45 seconds in a cyclical fashion, thus ensuring that the liquid in receptacle 14 is not overheated.

Instead of insulating jacket 16 the receptacle 14 may have inner and outer spaced apart walls separated by a vacuum chamber effective to provide the insulation, however, in this case a dimple or recess would be required in the outer wall to receive switch 98 and locate it adjacent inner wall to receive the heat of the heated liquid.

It will be understood that thermal activator switch 98 is responsive to and activated by the heat of the heated liquid. Thus switch 98 is only activated by introduction of a heated liquid, and a sufficient amount of the heated liquid must be introduced into the vessel 10, at a temperature not lower than a predetermined temperature, to activate the switch 98.

The switch 98 is located on surface 93 of receptacle 14 at a distance from the bottom interior surface of receptacle 14 such that switch 98 is activated by the heated liquid in the vessel 10, provided more than a residual level of liquid is maintained in vessel 10. When the liquid level falls such that the level is sufficiently remote from activator switch 98 and is only a residual level, switch 98 ceases to be activated, the circuit is opened and heating is discontinued.

The contact elements 36 and 38 may be employed for the recharging of rechargeable batteries in battery compartment 26.

As mentioned above, a second optional thermal activator switch 120 can be connected in series with switch 98. In this case, switch 120 opens when the temperature of the liquid in receptacle 14 rises above a predetermined desirable temperature. In this case also, timer 116 can be eliminated, because power is only used when the liquid is within the desired temperature range.

It will also be appreciated that other heating elements can be used, such as resistance-wise, either attached to the surface of the receptacle 14 or embedded therein.

What I claim as my invention is:

1. A vessel for maintaining a heated liquid in a heated state comprising:
    a receptacle adapted to house a heated liquid, electrical heating means integral with said receptacle for maintaining the heated liquid in a heated state, and power connection means electrically connected to said heating means, said connection means being adapted to connect said heating means to a source of electrical power, said electrical heating means including an electrical circuit and a thermal switch in said circuit, said switch being activatable by a predetermined minimum temperature of heated liquid in the receptacle whereby the heating means heats the heated liquid to maintain its temperature.

2. A vessel according to claim 1, and further including timer switch means interrupting the electrical connection between the heating means and the power connection means, said timer switch means being adapted to cyclically open and close electrical connection between said heating means and power connection means at predetermined intervals of time.

3. A vessel according to claim 1, further including a holder, said receptacle being mounted within said holder.

4. A vessel according to claim 3, including insulating means in said holder adapted to insulate said holder from a heated liquid in said receptacle.

5. A vessel according to claim 4, wherein said insulating means comprises an insulating jacket mounted within said holder between said holder and said receptacle, said jacket being adapted to insulate said holder from a heated liquid in said receptacle.

6. A vessel according to claim 3 and further including timer switch means interrupting the electrical connection between the heating means and the power connection means, said timer switch means being adapted to cyclically open and close electrical connection between said heating means and power connection means at predetermined intervals of time.

7. A vessel according to claim 3 wherein said holder comprises a base portion spaced from said receptacle, said base portion defining a battery compartment and said power connection means is adapted to be electrically connected to batteries mounted in said compartment.

8. A vessel according to claim 3, and further including a support plate having a cavity to receive said holder, said support plate having electrical contact members in said cavity adapted to engage corresponding electrical contact members on said holder.

9. A vessel for maintaining a heated liquid in a heated state comprising:
    a receptacle adapted to house a heated liquid, electrical heating means integral with said receptacle for maintaining the heated liquid in a heated state, and power connection means electrically connected to said heating means, said connection means being adapted to connect said heating means to a source of electrical power, and further including a thermal activator switch mounted in said receptacle, said switch electrically interrupting the electrical connection between said heating means and said power connection means, said switch being activatable by a predetermined minimum temperature of heated liquid in the receptacle, to complete electrical connection between said heating means and power connection means, and being deactivated when the liquid falls to a predetermined residual level of heated liquid in said receptacle, to interrupt the electrical connection.

10. A vessel according to claim 9, further including a holder, said receptacle being mounted within said holder.

11. A vessel for maintaining a heated liquid in a heated state comprising:
    a receptacle adapted to house a heated liquid, electrical heating means integral with said receptacle for maintaining the heated liquid in a heated state, and power connection means electrically connected to said heating means, said connection means being adapted to connect said heating means to a source of electrical power, and further including first and second thermal activator switches mounted in said receptacle, said switches electrically interrupting the electrical connection between said heating means and said power connection means, said switches being activatable by a predetermined minimum temperature of heated liquid in the receptacle to complete electrical connection between said heating means and power connection means, the first switch being deactivated when the liquid falls to a predetermined residual level of heated liquid in said receptacle, to interrupt the electrical connection, and said second switch being deactivated when the temperature of the liquid in the receptacle rises above a predetermined temperature, to interrupt the electrical connection.

12. A vessel according to claim 11, further including a holder, said receptacle being mounted within said holder.

13. A method of maintaining a heated liquid in a heated state comprising:
    introducing a heated liquid into a vessel comprising a receptacle adapted to house the heated liquid, said receptacle having electrical heating means integral therewith for maintaining the heated liquid in a heated state, and power connection means electrically connected to said heating means, said connection means being adapted to connect said heating means to a source of electrical power, and
    heating said liquid in said receptacle with said heating means,
    automatically activating said heating means in response to the liquid temperature provided said temperature is not lower than a predetermined drinking temperature, and automatically deactivating the heating means when the liquid level falls to a residual level.

14. A method of maintaining a heated liquid in a heated state comprising:

introducing a heated liquid into a vessel comprising a receptacle adapted to house the heated liquid, said receptacle having electrical heating means integral therewith for maintaining the heated liquid in a heated state, and power connection means electrically connected to said heating means, said connection means being adapted to connect said heating means to a source of electrical power, and heating said liquid in said receptacle with said heating means, automatically activating said heating means with a thermal activator switch responsive to temperature of the heated liquid, said switch means being remote from said residual level, such that fall of the liquid level to said residual level deactivates the switch.

15. A method of maintaining a heated liquid in a heated state comprising:

introducing a heated liquid into a vessel comprising a recepacle adapted to house the heated liquid, said receptacle having electrical heating means integral therewith for maintaining the heated liquid in a heated state, and power connection means electrically connected to said heating means, said connection means being adapted to connect said heating means to a source of electrical power, and heating said liquid in said receptacle with said heating means, automatically activating said heating means in response to the liquid temperature provided said temperature is not lower than a predetermined drinking temperature, and automatically deactivating the heating means when the liquid temperature rises above a second temperature.

16. A vessel for maintaining a heated liquid in a heated state comprising:

a receptacle adapted to house a heated liquid, electrical heting means integral with said receptacle for maintaining the heated liquid in a heated state, and power connection means electrically connected to said heating means, said connection means being adapted to connect said heating means to a source of electrical power, said electrical heating means including an electrical circuit and a thermal switch in the circuit, said switch being deactivatable when the liquid falls to a predetermined residual level of heated liquid in the receptacle to open the electrical circuit whereby heating of the heated liquid is interrupted, said switch being remote from said residual level.

* * * * *